United States Patent [19]

Bouvet et al.

[11] 4,363,636

[45] Dec. 14, 1982

[54] PROCESS TO INCREASE THE EFFECTIVENESS OF BAGASSE AS A SOURCE OF ENERGY

[75] Inventors: Pierre E. Bouvet, Kukuihaele; Norland L. C. Suzor, Paauilo, both of Hi.

[73] Assignee: Davies Hamakua Sugar Company, a division of Theo. H. Davies & Co., Ltd., Paauilo, Hi.

[21] Appl. No.: 311,642

[22] Filed: Oct. 15, 1981

[51] Int. Cl.$^3$ ............................ C10L 5/44; C10L 5/08
[52] U.S. Cl. .................................. 44/10 A; 44/1 D; 44/10 E; 44/10 G; 44/15 B
[58] Field of Search ............... 44/1 D, 15 B, 10 A, 44/10 E, 10 G, 10 R, 32, 1 R

[56] References Cited

U.S. PATENT DOCUMENTS

| | | | |
|---|---|---|---|
| 1,258,888 | 3/1918 | Geveke | 44/10 A |
| 1,258,889 | 3/1918 | Geveke | 44/4 |
| 3,013,880 | 12/1961 | King | 99/8 |
| 3,436,312 | 4/1969 | Lednor | 44/1 R |
| 3,946,660 | 3/1976 | Kuhtreiber | 100/39 |
| 4,015,951 | 4/1977 | Gunnerman | 44/10 E |
| 4,211,740 | 7/1980 | Dean et al. | 264/68 |
| 4,229,183 | 10/1980 | Eneroth et al. | 44/1 D |
| 4,236,897 | 12/1980 | Johnston | 44/10 A |
| 4,308,033 | 12/1981 | Gunnerman | 44/6 |

FOREIGN PATENT DOCUMENTS

| | | | |
|---|---|---|---|
| 232399 | 1/1961 | Australia | 44/15 B |
| 20312 | of 1911 | United Kingdom . | |
| 14983 | of 1915 | United Kingdom . | |

OTHER PUBLICATIONS

"Pelletizing Bagasse for Fuel", P. E. Bouvet and Norland L. C. Suzor, *SUGAR y AZUCAR,* Aug. 1980.

*Primary Examiner*—Carl F. Dees
*Attorney, Agent, or Firm*—Bacon & Thomas

[57] ABSTRACT

The effectiveness of bagasse as a source of energy is increased by a flexible operation adapted to the power requirements, fuel storage requirements and other variables of a sugar mill operation. Part or all of a primary stream of bagasse from the sugar mill is dried from its initial moisture content, e.g. in the order of 50%, to a lower moisture content, e.g. in the order of 35%, using a portion of the hot flue gases from the boilers which are used to supply power for the sugar mill operation. The resulting drier material is separated to provide an oversize particle stream which may be sent directly to the boiler for burning, to storage in the bagasse house, or to a secondary drying operation, and a secondary stream of fine particle size bagasse components which are most suitable for further process and densification. This secondary stream, with optional addition of oversize particles from the primary drying operation, is then dried in contact with another portion of hot flue gases to a moisture content suitable for densification, about 6-12% where a pellet mill is employed, and is further subjected to particle size selection, if necessary, and then subjected to densification in a pellet mill or other suitable equipment. The densified material is then sent to storage, returned to the boilers for part or all of the fuel requirement or transported to other potential users.

13 Claims, 1 Drawing Figure

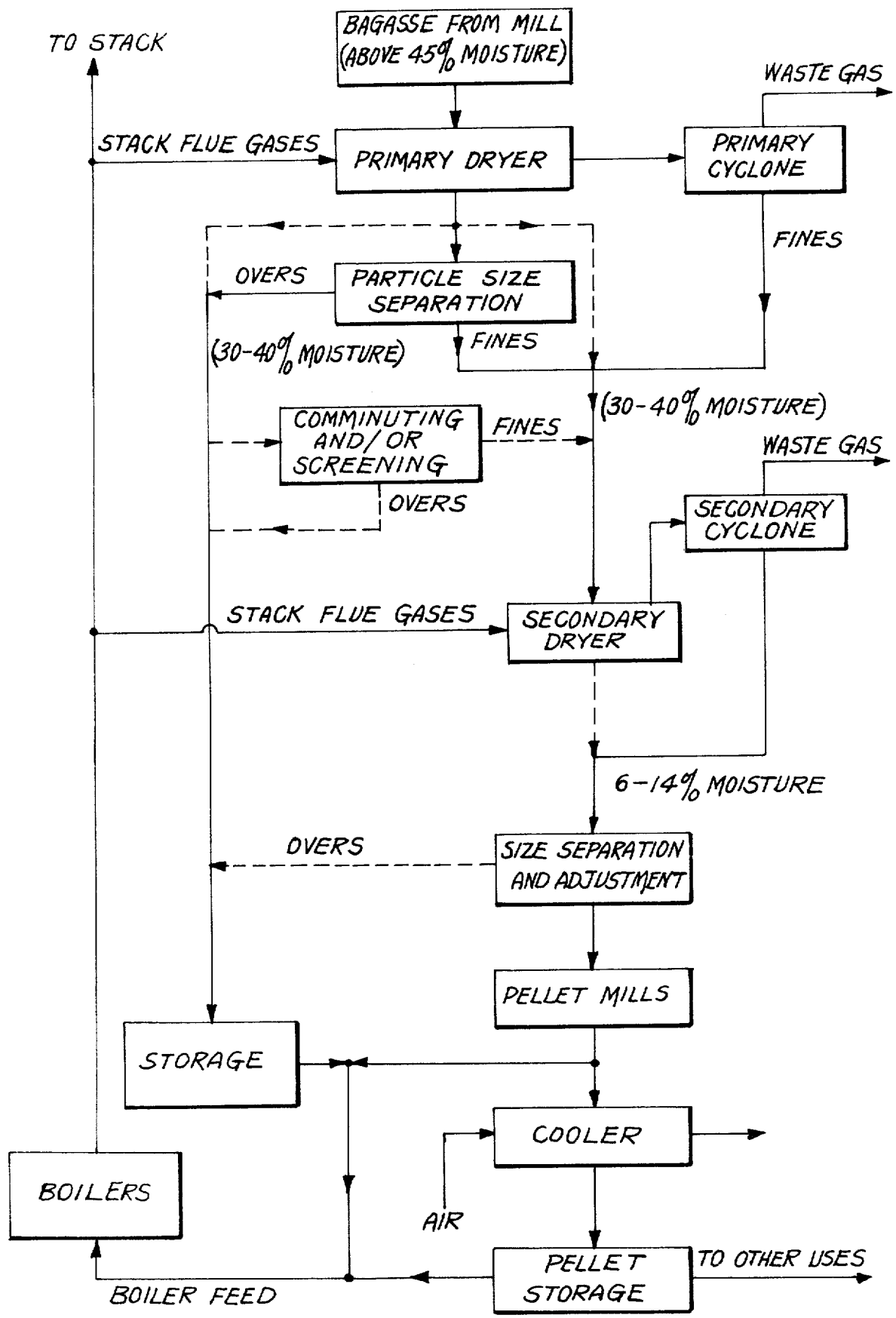

PROCESS TO INCREASE THE EFFECTIVENESS OF BAGASSE AS A SOURCE OF ENERGY

BACKGROUND OF THE INVENTION

Bagasse, a fibrous residue from sugar cane processing, has traditionally been used as a fuel to provide motive auxiliary power for sugar mill operations. This has been accomplished by burning the bagasse in a boiler and using the steam as a direct power source and/or converting the steam into electrical energy for in house use and, when appropriate, export. Boiler efficiencies are low with most losses occurring in stack flue gas.

During recent times, as fossil fuels have become scarcer and more costly, efforts have been made to increase the efficiency of bagasse conversion into both kinetic and potential energy forms. Generally these efforts have been in the area of drying the bagasse through various methods thereby increasing its combustion efficiency or increasing the efficiency of the boilers by using higher steam pressures, better use of insulation, optimization of combustion techniques, etc. Utilities must accept electrical energy from non-fossil sources when that energy is provided continuously year round and at a specified minimum rate. Electrical generation in sugar factories in the past have provided only short term variable electrical power to the utility company, which reduced the desirability of this energy to the utility.

The drying and compacting of cellulosic wastes to improve their utility for fuel and other purposes is known in the art. Patents in this field include British Pat. No. 20,312 of 1911, British Pat. No. 14,983 of 1915, U.S. Pat. No. 1,258,888 to Geveke, U.S. Pat. Nos. 2,786,760 and 2,870,481 to Bonnafoux, U.S. Pat. No. 2,995,445 to Briggs et al, U.S. Pat. No. 3,013,880 to King, U.S. Pat. No. 3,586,511 to Bishop, U.S. Pat. No. 3,946,660 to Kuhtreiber, U.S. Pat. No. 4,015,951 to Gunnerman and U.S. Pat. No. 4,236,897 to Johnston. Of these patents, the British Pat. No. 14,983 and U.S. Pat. No. 1,258,888 to Geveke specifically relate to the processing of bagasse or, in the case of the British patent, megass. These patents indicate that there are serious problems in handling this material. The Johnston U.S. Pat. No. 4,236,897 mentions bagasse among a number of other natural cellulosic materials which may be pelleted by combining them with thermoplastic polymeric material.

The British Pat. No. 14,983 discloses that it has been found impossible with mill megass to produce a satisfactory briquette without reducing the water content artificially to about 5 or 6%. To avoid this, the patent proposes to cut the megass into lengths of about ¼ of an inch, squeeze out 60 to 80% of the sweet liquid, steam the resulting squeezed material and then briquette it under heavy pressure.

The patent to Geveke discloses the baling of wet bagasse from the crusher mills, permitting the bales to dry and then cutting the bagasse into small pieces and briquetting it. The amount of moisture is not specified.

The patent to Bishop deals with sugar cane and relates to the making of an animal feed rather than a fuel pellet. In the proposed process sugar cane is burned in the field by controlled burning to burn off dead, dry leaves and simultaneously decrease the moisture content of the remaining stalks. The stalks are then harvested, chopped into particles sizes ranging from fine to approximately ¼ of an inch, dried to 1 to 3% moisture, rehydrated to about 3 to 8% moisture and pelleted by extrusion through a ¼ inch die.

These early patents relating to bagasse and sugar stalks indicate that there is a special problem involved in briquetting this type of material and that special procedures are necessary, including steam digestion as in the British Pat. No. 14,983 or drying and rehydrating as in Bishop U.S. Pat. No. 3,586,511. These patents would also indicate that it is necessary to reduce the moisture content prior to briquetting to about 5 to 6% (British Pat. No. 14,983) or 3 to 8% (the Bishop patent).

The patent to Johnston U.S. Pat. No. 4,236,897, which includes bagasse as one of the materials which can be pelleted by the process disclosed in that patent, requires that from about 1 to 50% by weight of polymeric thermoplastic material be present as well as the cellulosic waste material. The cellulosic material must be comminuted to a particle size such that all of the particles are minus 5 mesh and at least 50% of the particles are minus 10 mesh. There are no specific examples of treating bagasse.

The patent to Bonnafoux U.S. Pat. No. 2,786,760 discloses that alfalfa hay may be ground in a hammer mill to relatively small fragments, the moisture content adjusted as by means of steam, and the resulting material subjected to extrusion during which the temperature may rise to 125° to 210° F. The exact amount of moisture is not specified.

The Briggs et al U.S. Pat. No. 2,995,445 discloses a process for making a wafer or briquette from alfalfa hay and recommends a moisture content within the range of 12 to 25% with the preferred being approximately 15%. A product having a specific gravity within the range of 0.9 to 1.1 is produced.

The King et al patent discloses that conventional hay pelleting processes require the use of relatively dry hay having a moisture content of less than 14%.

The Gunnerman patent is primarily concerned with pelleting wood wastes and specifies comminuting the waste material to a particle size no more than 85% of the minimum dimension of the pellet to be produced and adjustment to 16 to 28% moisture before pelleting. It has been found that these conditions are not satisfactory for pelleting bagasse. The Gunnerman patented process is known in the trade as the "Woodex" process. A proposal for converting the "Woodex" process to process bagasse has been published in Sugar y Azucar, August 1980 issue and for purposes of background information the disclosure of this publication is incorporated herein.

OVERVIEW OF THE INVENTION

This invention incorporates known unit operations such as drying, particle classification and densification in its process but combines them in a novel manner permitting optimum energy extraction from a sugar factory complex.

Sugar factories operate on an intermittent basis i.e. they generally shut down for extensive periods of time during the year for repair and/or to avoid the unfavorable weather conditions of the seasons. They also may cease processing for shorter periods of time during the normal operating period either for small scale repairs or for other operational economies such as scheduling, etc.

During the periods of factory processing bagasse flows continually, while during the shorter period of non-operation, bagasse has been fed from a bagasse storage house to the boiler thereby maintaining steam pressure for auxiliary operations. This bagasse storage house is periodically refilled during the operational periods. This relatively short term storage technique has been effective in keeping auxiliary machines and lighting for the factory in operation during brief non-productive times. Storing bagasse to perform the same functions for longer periods of time has a high fire risk due to its exothermic reaction resulting from fermentation. It also has not been economical due to the bulkiness of the material (approximately 6-9 lb./cu. ft.) and its relatively low B.t.u. content (approximately 3,000-4,000 B.t.u./lb.) which is caused by its high moisture content (approximately 50%) as it comes from the mill.

This invention shows how the bagasse can be utilized in an effective energy conversion system in synergism with the sugar factory to provide an overall efficiency greater than that obtainable by using methods heretofore known.

Drying combined with densification of the bagasse permits economical storage and/or transportation. When so treated, bagasse has a net effective heat content approximately 8-10 times per unit volume greater than the bagasse from the mill. This ability to store (and transport) energy at costs equivalent to a low grade coal makes large volume storage economical and therefore enables the convenient translation of any and all thermal efficiencies realized in the sugar factory production cycle into a storable energy source. In accordance with the invention, drying and densification are accomplished with a minimum expenditure of energy for heating and comminution.

SUMMARY OF THE INVENTION

The flow of bagasse from the sugar mill is composed of a mixture of variously sized material from small particles less than the size necessary for densification to larger particles unsuitable without shredding or other such comminuting techniques for densification. This primary stream of bagasse from the mill is dried from its initial moisture content to a lower moisture content using the portion of the heated flue gases from the boiler which are not used in the secondary process. In this dryer state the material is then preliminarily screened either mechanically and/or pneumatically to extract the components by size and composition most suitable for further processing and densification; the composition of bagasse is variable due to differences in cane processing, weather, cane type, harvesting techniques and other variables associated with sugar cane processing.

The resulting mixture is composed of not only the necessary ratio of components such as fiber to pith, but is also adjusted to minimize the amount of harmful materials such as dirt or ash. This "secondary" material is then further dried to a specific densification moisture using the required amount of boiler flue gas. Then further selection for particle size is accomplished by screening and/or shredding. The material is now prepared for densification.

The densified material can now be sent to storage, or for transportation to other potential users. The primary material may be sent directly to the boiler for burning, with the excess material used to stock the bagasse house. Or by regulating the ratio between the primary and the secondary material, all of the surplus can be densified and stored to not only perform the short term functions of the bagasse house, but also the longer term functions as required.

DRAWING

The invention will be further understood by reference to the accompanying flow sheet drawing.

Referring now to the block diagram, bagasse from the mill, which may contain from about 45 to 55% or more free moisture depending on time of harvest, weather conditions, and the like, and which has a calorific value of, for example, 3000 to 4000 B.t.u./lb, is introduced into a primary dryer where the moisture is reduced to about 30 to 40%, preferably about 35%, by direct contact with a stream of hot stack flue gases diverted from the boiler stack of the sugar mill.

The temperature of the hot stack flue gases is typically in the range of 190° to 220° C. While various types of dryers may be used, it is preferable to use a large rotary dryer and to adjust the velocity of flow of gases through the dryer to effect a size separation of the bagasse particles by entraining fine particles in the effluent gases. As shown, these gases pass through a primary cyclone separator, or a battery thereof to provide a stream of fine particles. The particles from the primary dryer which are not entrained in the effluent gases may be subjected to size separation by a suitable screening or other size classification technique to provide a further stream of fines and a stream of oversize particles. Preferably, the size adjustment of the particles in the two fines stream is such that substantially all of the particles are in the range for subsequent pelleting in a pellet mill. Preferably, the maximum dimension of the particles at this point will be no greater than about one-half inch although a few particles may exceed this dimension.

The oversize particles from the size separation following the primary dryer contain about 30 to 40% moisture and have a calorific value in the range of about 5000 to 5500 B.t.u./lb. These particles, in time of normal operation of the sugar mill, may be fed directly to the boilers where boiler efficiency is much improved over the use of wet bagasse of higher moisture content. Where not needed for this purpose, the oversize particles are sent to storage in the bagasse house, or combined in part or in total amount with the fines from the primary cyclone for entry into the secondary system. Alternatively, they may be comminuted by a hammer mill, or the like, and subjected to size separation to provide further fines which are combined with the fines streams from the primary cyclone separator and particle size separator from the primary dryer.

The combined fines streams are now introduced into a secondary dryer into direct contact with hot flue gases from the boiler stack. In this dryer, which may also be of the large rotary type, gas volumes and velocities are such that all of the fines are entrained in the effluent gases. The particles are dried to a moisture content in the range of about 6 to 14% moisture, preferably 8 to 12%. The dried particles are collected in a secondary cyclone separator, or battery of such separators, and are in condition for densification.

Optionally, further size adjustment may be made at this point to remove remaining oversize particles should there be a sufficient amount present to adversely effect the pelleting operation. Oversize particles may be combined with the oversize streams from the other classification operations. If desired, all oversize particles from all sources may be further comminuted and the resulting particles combined with the fines stream for densification.

The fines streams are then fed to apparatus for densification into shapes of a size suitable for boiler feed. The invention has been illustrated with a showing of a pellet mill densification apparatus. However, it will be understood that other densification techniques and apparatus could be used.

Where pellet mills are employed, they can be of known types, such as those manufactured by the California Pellet Mill Company of San Francisco, Calif. or by the Koppers Sprout-Walden Company. The temperatures and pressures in the mill are generally lower than those used in the Woodex process described in the Gunnerman U.S. Pat. No. 4,015,951. Surprisingly, a pellet of sufficient strength to hold its shape during storage and transport may be produced by the present process without the use of thermoplastic binders as required by the process of the Johnston U.S. Pat. No. 4,236,897 and without the critical moisture, temperature and pressure conditions of the Gunnerman patent.

Typically, in the present process, pellet sizes vary from about ¼ to ⅜ inch in diameter and lengths vary up to approximately 1.5 inches with more than fifty percent of the pellets being in excess of about ¾ inch in length. For producing these pellets, the particle maximum dimension prior to pelletizing can be up to about 1.25 times the diameter of the extruded pellets.

The conditions under which the pellet mill is operated can be such that the temperature of the extruded pellets is under 100° C., typically in the range of 70° to 90° C., the smaller the pellet size the higher the temperature. Under these conditions, there is very little loss of moisture during the pelleting operation and the wear on the pellet mill is minimized. The extruded pellets still contain a significant amount of moisture, e.g. up to 12%.

Following the pellet mill, the pellets are cooled by contact with ambient air and their moisture content and temperature reach equilibrium with that of the surrounding atmosphere. The specific density of a typical individual pellet is about 80–90 lbs./cu. ft. and the bulk density of the pellets is about 40–50 lbs./cu. ft. The pellets upon burning provide about 7500–8000 B.t.u./lb.

As shown, these pellets may now be stored and are available for year round use for feeding the boilers for power generation thereby providing a constant supply of surplus electrical energy for use by the utility companies, as well as, providing a source of fuel for off-season operations and/or normal operations of the sugar plant.

The process is quite versatile and can be changed to meet changing conditions and needs. For example, it can be conducted with little or no use of power-consuming disintegrating and shredding equipment since the fines recovered from the drying and classifying operations may comprise up to 70% of the total bagasse produced by the mill. The remainder, in this instance, is fed to the boilers as oversize material of reduced moisture content after passage through the primary dryer. Alternatively, any amount up to 100% of the oversize material may be comminuted if it is desired to convert all of the bagasse to pellets. Since only a fraction of the total material is comminuted, substantial savings in energy are realized.

Typical Embodiment

A. The primary system

All the bagasse flowing from the sugar mill (moisture content about 48%) is passed through a rotary dryer with a portion of the hot flue gases from the boiler exhaust to reduce the moisture content of the particles to about 35%. At the end of the dryer the heavier larger materials (overs) are extracted through an air lock, while the lighter smaller materials (fines) are extracted with the cooled gas and the entrained water vapour and are then passed through a cyclone where the particulates are separated from the gas and water vapour for further processing in the secondary system. The gas and the water vapour are exhausted into the atmosphere. The overs are now available for further processing which may include:

1. direct return to the boiler as fuel or to the bagasse storage house;
2. selection by screening of a portion of fines from the overs for entry into the secondary system;
3. selection of all the material for entry into the secondary system.

B. The secondary system

In one embodiment, the material selected to enter the secondary system is the fine material from the primary cyclone and fine material resulting from screening the overs from the primary dryer. This material, of about 35% moisture content, and containing a large proportion of material of a size suitable for pelleting, is introduced into the secondary dryer in contact with another portion of hot flue gases from the boiler. The secondary drying process has first priority use of the hot flue gases to ensure that the critical densification moisture level is attained. The remaining gas volumes are then available to the primary system. After passing through the secondary dryer, the particles at about 8–10% moisture are separated from the gases in the secondary cyclone. If the fines at this point are suitable for pelleting they are passed to the pelleting machine. The particle size prior to pelleting may be optimized at this point, if desired, by further screening and/or shredding, which is very efficient on the drier material. The pelleted material is now sent to storage or to the boilers.

Alternatively, the material selected to enter the secondary system may contain a part or all of the oversize particles along with fines from the primary cyclone, and in this instance further size classification and/or shredding of the material following the secondary dryer and prior to pelleting will be necessary.

BENEFITS OF THE SYSTEM

1. Enables densification of bagasse with a minimum expenditure of energy; i.e. waste heat is used for the drying and material selection is done by screening with only a minimum amount of shredding as necessary.
2. The components to be densified can be varied as dictated by changes in the bagasse condition and composition.
3. Provides the sugar factory an economical method of storing energy, thereby encouraging energy conservation practices in sugar cane processing.
4. Provides for additional revenues by generating energy surpluses in convenient convertible form.

5. Reduces the amount of atmospheric pollutants (particulates discharged) by increasing combustion efficiency of burnt materials.

6. Creates an overall increase in boiler efficiency.

7. Enables linear energy production for export throughout the entire year from a prime source which is normally available only periodically.

8. Enables a low density, low calorific fuel which has a high risk in storage to be converted to a high density, high calorific, safe fuel.

9. Allows the safe economical storage of all energies conserved which would normally be lost to the environment; i.e. the heat in the stack flue gas is effectively stored in pellet form rather than being lost to the atmosphere.

Although the invention has been described in detail for the purpose of illustration it is to be understood that variations can be made by those skilled in the art without departing from the spirit and scope of the invention except as it may be limited by the claims.

What is claimed is:

1. A process for increasing the effectiveness of bagasse as a source of energy in combination with a sugar mill operation in which bagasse from the mill is used as a boiler fuel for the sugar mill operation, comprising: subjecting a stream of wet bagasse from the mill to a primary drying operation in which said bagasse is contacted with a stream of flue gases from the boiler to reduce the moisture content of the bagasse to about 25-40%, size separating the resulting bagasse into a stream containing larger particle components of the bagasse and a secondary stream containing smaller particle components of the bagasse, subjecting said secondary stream of particles to a secondary drying operation in which said particles are contacted with a stream of flue gases from the boiler to reduce their moisture content to about 8 to 14% and densifying the resulting dried bagasse from the secondary drying operation into compacted shapes suitable for boiler firing.

2. The process of claim 1 wherein at least a portion of the bagasse containing said larger particles is combined with the secondary stream containing said smaller particles prior to introduction into the said secondary drying operation and wherein the particles from the secondary drying operation are subjected to particle size adjustment prior to densification.

3. The process of claim 1 wherein at least a portion of the stream of bagasse containing said larger particles is subjected to comminution and classification to provide additional fine particles and said fine particles are combined with said secondary stream of particles prior to the secondary drying operation.

4. The process of claim 1 wherein the compacted shapes are stored for year round fuel supply to the sugar mill boilers.

5. The process of claim 2 wherein said particle size adjustment comprises size separation of the particles into a fines fraction suitable for pelleting in a pellet mill and an oversize fraction unsuitable for pelleting, comminution of the oversize fraction and return of fines resulting from said comminution to the said fines fraction.

6. A process for increasing the effectiveness of bagasse as a source of energy in combination with a sugar mill operation in which bagasse from the mill is used as boiler fuel for the sugar mill operation, comprising: subjecting a stream of wet bagasse from the mill to a primary drying operation in which said bagasse is contacted with a stream of flue gases from the sugar mill boiler or boilers to reduce the moisture content of the bagasse to about 25 to 40%, size separating the resulting bagasse into a primary stream of particles which are oversize for densification and a secondary stream of finer particles which contains components of a size suitable for densification, conveying the stream of oversize particles to the sugar mill boiler or boilers for fuel or to a bagasse fuel storage house, subjecting the secondary stream of bagasse particles to further drying in a secondary drying operation in which the bagasse particles are contacted with boiler flue gases to reduce their moisture content to about 8 to 14%, and densifying the resulting dried bagasse from the secondary dryer into compacted shapes suitable for boiler firing.

7. The process of claim 6 wherein the bagasse is dried in the primary drying operation to approximately 30 to 40% moisture and the bagasse is dried in the secondary drying operation to approximately 8 to 12% moisture.

8. The process of claim 7 wherein bagasse particles from the secondary drying operation are compressed into fuel pellets in a pellet mill.

9. The process of claim 8 wherein bagasse particles from the secondary drying operation are compressed into pellets having a size in the range of about ¼ to ⅜ inch in diameter and up to approximately 1.5 inches maximum length with more than about 50% of the pellets being in excess of ¾ inch in length.

10. The process of claim 9 wherein the particle length of the bagasse particles subjected to pelletization is up to 1.25 times the diameter of the extruded pellet.

11. The process of claim 7 wherein oversize particles from the primary or secondary drying operation are subjected to size reduction and then recombined with the secondary stream.

12. A process for increasing the effectiveness of bagasse as a source of energy in combination with a sugar mill operation in which bagasse from the mill is used as a boiler fuel for the sugar mill operation, comprising: subjecting a stream of wet bagasse containing coarse and fine particles from the sugar mill to a drying operation in which said bagasse is contacted with a stream of hot flue gases from the boiler and drying said fine particles to a moisture content of about 8–14%, separating the dried fine particles from the coarse particles and densifying said fine particles at a moisture content of about 8–14% into compacted shapes for use as fuel.

13. Fuel pellets produced by the process of claim 12 comprising compressed bagasse particles, in the absence of added binding agent, said pellets being of approximately ¼ to ⅜ inch in diameter and approximately 1.5 inches maximum length, said pellets having a bulk density of about 40 to 50 pounds per cubic foot with individual pellets having a specific density of about 80 to 90 pounds per cubic foot, and said pellets developing a B.t.u./lb. of about 7500 to 8000 B.t.u./lb. upon burning.

* * * * *